(12) United States Patent
Kamath

(10) Patent No.: US 11,640,159 B2
(45) Date of Patent: May 2, 2023

(54) SYSTEMS AND METHODS FOR FIELD DEVICE INTERACTION MONITORING

(71) Applicant: ABB Schweiz AG, Baden (CH)

(72) Inventor: Shanthala Kamath, Bangalore (IN)

(73) Assignee: ABB SCHWEIZ AG, Baden (CH)

(*) Notice: Subject to any disclaimer, the term of this patent is extended or adjusted under 35 U.S.C. 154(b) by 37 days.

(21) Appl. No.: 17/122,368

(22) Filed: Dec. 15, 2020

(65) Prior Publication Data
US 2022/0187804 A1 Jun. 16, 2022

(51) Int. Cl.
*G05B 19/418* (2006.01)

(52) U.S. Cl.
CPC ... *G05B 19/41865* (2013.01); *G05B 19/4183* (2013.01); *G05B 19/41885* (2013.01)

(58) Field of Classification Search
CPC .......... G05B 19/41865; G05B 19/4183; G05B 19/41885
See application file for complete search history.

(56) References Cited

U.S. PATENT DOCUMENTS

| 10,489,005 B2 | 11/2019 | Grover et al. |
| 10,671,283 B2 | 6/2020 | Vasudev et al. |
| 2003/0046142 A1* | 3/2003 | Eitel ............. H04M 7/003 705/7.42 |
| 2003/0151508 A1* | 8/2003 | Frame ............. B66C 15/045 340/8.1 |
| 2004/0186927 A1* | 9/2004 | Eryurek ............. G05B 23/0278 710/13 |
| 2008/0162930 A1* | 7/2008 | Finney ............. H04L 63/083 726/4 |
| 2009/0077055 A1 | 3/2009 | Dillon et al. |
| 2017/0248944 A1* | 8/2017 | Rath ............. G05B 23/0216 |
| 2018/0088564 A1* | 3/2018 | Billi-Duran ...... G05B 19/41865 |
| 2018/0356800 A1* | 12/2018 | Chao ............. G05B 19/406 |

OTHER PUBLICATIONS

European Search Report for EP21214399 dated Apr. 6, 2022, 10 pgs.

* cited by examiner

*Primary Examiner* — Christopher E. Everett
(74) *Attorney, Agent, or Firm* — Armstrong Teasdale LLP

(57) ABSTRACT

Systems and methods for field device interaction monitoring may include an analysis compute device having circuitry configured to obtain user interaction data produced by one or more field devices used in an industrial process of an industrial plant. The user interaction data may be indicative of interactions made by one or more users through a human machine interface of a corresponding field device. The circuitry may be additionally configured to analyze the user interaction data to determine a responsive action to increase an efficiency of the industrial process at the industrial plant and perform the responsive action.

19 Claims, 6 Drawing Sheets

SYSTEMS AND METHODS FOR FIELD DEVICE INTERACTION MONITORING

BACKGROUND

Industrial assets, such as field devices (e.g., fluid flow measurement devices, actuator devices, electrical drives, power generation or distribution devices, etc.) perform key functions in industrial processes carried out by industrial plants, such as the refinement and/or distribution of oil, generation of power, or other processes. Over time, field devices may require maintenance, such as diagnostics, repair, reconfiguration, and verification of proper operation. Each time a maintenance operation is to take place, a variety of related activities typically must be performed, such as obtaining permission to perform the maintenance, generating work permit(s), gathering personal protective equipment (e.g., ventilators, goggles, etc.), setting the industrial process to a state that enables the maintenance activity, accessing the corresponding field device(s) (e.g., traveling to the location of the field device(s), removing housing(s) to enable access to component(s) of the field device(s), etc.), returning the industrial process to a desired state after the maintenance has been performed, and closing the work permit(s). Given the many the activities that must be performed in connection with each maintenance event, the maintenance of field devices represents a significant drain on the efficiency with which an industrial process is carried out in an industrial plant.

SUMMARY

According to one aspect of the present disclosure, a system may comprise an analysis compute device. The analysis compute device may include circuitry configured to obtain user interaction data produced by one or more field devices used in an industrial process of an industrial plant. The user interaction data may be indicative of interactions made by one or more users through a human machine interface of a corresponding field device. The circuitry may be further configured to analyze the user interaction data to determine a responsive action to increase an efficiency of the industrial process at the industrial plant and perform the responsive action.

In some embodiments, to analyze the user interaction data comprises to identify an efficiency of one or more users of the one or more field devices based on amounts of time spent performing operations with the one or more field devices.

In some embodiments, the circuitry is further to identify one or more users associated with a maintenance shift in which time spent performing one or more maintenance operations exceed a reference threshold.

In some embodiments, to perform the responsive action comprises to produce a report indicative of one or more users that should receive training to increase their efficiency.

In some embodiments, to obtain user interaction data comprises to obtain user interaction data that is further indicative of an identity of each user that interacted with the corresponding field device and to analyze the user interaction data comprises to identify an unauthorized access to a field device.

In some embodiments, to identify an unauthorized access to a field device comprises to identify usage of a field device outside of an authorized time period.

In some embodiments, to analyze the user interaction data comprises to identify an unauthorized presence of a person within a predefined range of one or more field devices.

In some embodiments, to identify an unauthorized presence of a person comprises to identify an unauthorized presence of a person based on an identifier of a wireless communication device of the person obtained by a field device.

In some embodiments, to perform the responsive action comprises to produce an alert indicative of an unauthorized access to a field device.

In some embodiments, to analyze the user interaction data comprises to determine a manufacturer of each field device as a function of a device identifier in the user interaction data.

In some embodiments, to produce a report indicative of one or more field devices determined to be unreliable comprises to produce a report indicative of one or more field devices that are determined to be unreliable due to a manufacturer of the one or more field devices.

In some embodiments, to analyze the user interaction data comprises to determine a location of each field device in the industrial plant as a function of a field device identifier in the user interaction data and a data set that associates field device identifiers with portions of the industrial plant.

In some embodiments, to perform the responsive action comprises to produce an alert indicative of unauthorized access to a portion of the industrial plant.

In some embodiments, to perform a responsive action comprises to produce a report indicative of one or more field devices that are determined to be unreliable due to the location of the one or more field devices in the industrial plant.

In some embodiments, to obtain the user interaction data comprises to obtain the user interaction data through wired or wireless communication with the one or more field devices.

In some embodiments, to analyze the user interaction data comprises to identify maintenance events for the one or more field devices.

In some embodiments, to analyze the user interaction data comprises to identify one or more field devices having a set of maintenance events that satisfies a predefined threshold.

In some embodiments, to identify one or more field devices having a set of maintenance events that satisfies a predefined threshold comprises to identify one or more field devices that have a higher frequency or duration of maintenance events than other field devices.

According to another aspect of the present disclosure, a method may include obtaining, by an analysis compute device, user interaction data produced by one or more field devices used in an industrial process of an industrial plant. The user interaction data may be indicative of interactions made by one or more users through a human machine interface of a corresponding field device. The method may additionally include analyzing, by the analysis compute device, the user interaction data to determine a responsive action to increase an efficiency of the industrial process at the industrial plant and performing, by the analysis compute device, the responsive action.

In some embodiments, analyzing the user interaction data comprises identifying an efficiency of one or more users of the one or more field devices based on amounts of time spent performing operations with the one or more field devices.

In some embodiments, the method additionally includes identifying one or more users associated with a maintenance shift in which time spent performing one or more maintenance operations exceed a reference threshold.

In some embodiments, performing the responsive action comprises producing a report indicative of one or more users that should receive training to increase their efficiency.

In some embodiments, obtaining user interaction data comprises obtaining user interaction data that is further indicative of an identity of each user that interacted with the corresponding field device and analyzing the user interaction data comprises identifying an unauthorized access to a field device.

In some embodiments, identifying an unauthorized access to a field device comprises identifying usage of a field device outside of an authorized time period.

In some embodiments, analyzing the user interaction data comprises identifying an unauthorized presence of a person within a predefined range of one or more field devices.

In some embodiments, identifying an unauthorized presence of a person comprises identifying an unauthorized presence of a person based on an identifier of a wireless communication device of the person obtained by a field device.

In some embodiments, performing the responsive action comprises producing an alert indicative of an unauthorized access to a field device.

In some embodiments, analyzing the user interaction data comprises determining a manufacturer of each field device as a function of a device identifier in the user interaction data.

In some embodiments, producing a report indicative of one or more field devices determined to be unreliable comprises producing a report indicative of one or more field devices that are determined to be unreliable due to a manufacturer of the one or more field devices.

In some embodiments, analyzing the user interaction data comprises determining a location of each field device in the industrial plant as a function of a field device identifier in the user interaction data and a data set that associates field device identifiers with portions of the industrial plant.

In some embodiments, performing the responsive action comprises producing an alert indicative of unauthorized access to a portion of the industrial plant.

In some embodiments, performing a responsive action comprises producing a report indicative of one or more field devices that are determined to be unreliable due to the location of the one or more field devices in the industrial plant.

In some embodiments, obtaining the user interaction data comprises obtaining the user interaction data through wired or wireless communication with the one or more field devices.

In some embodiments, analyzing the user interaction data comprises identifying maintenance events for the one or more field devices.

In some embodiments, analyzing the user interaction data comprises identifying one or more field devices having a set of maintenance events that satisfies a predefined threshold.

In some embodiments, identifying one or more field devices having a set of maintenance events that satisfies a predefined threshold comprises identifying one or more field devices that have a higher frequency or duration of maintenance events than other field devices.

In another aspect of the present disclosure, one or more machine-readable storage media may comprise a plurality of instructions stored thereon that, in response to being executed, cause a compute device to obtain user interaction data produced by one or more field devices used in an industrial process of an industrial plant. The user interaction data may be indicative of interactions made by one or more users through a human machine interface of a corresponding field device. The instructions may further cause the compute device to analyze the user interaction data to determine a responsive action to increase an efficiency of the industrial process at the industrial plant. The instructions may further cause the compute device to perform the responsive action.

In some embodiments, to analyze the user interaction data comprises to identify an efficiency of one or more users of the one or more field devices based on amounts of time spent performing operations with the one or more field devices.

In some embodiments, the instructions further cause the compute device to identify one or more users associated with a maintenance shift in which time spent performing one or more maintenance operations exceed a reference threshold.

In some embodiments, to perform the responsive action comprises to produce a report indicative of one or more users that should receive training to increase their efficiency.

In some embodiments, to obtain user interaction data comprises to obtain user interaction data that is further indicative of an identity of each user that interacted with the corresponding field device and to analyze the user interaction data comprises to identify an unauthorized access to a field device.

In some embodiments, to identify an unauthorized access to a field device comprises to identify usage of a field device outside of an authorized time period.

In some embodiments, to analyze the user interaction data comprises to identify an unauthorized presence of a person within a predefined range of one or more field devices.

In some embodiments, to identify an unauthorized presence of a person comprises to identify an unauthorized presence of a person based on an identifier of a wireless communication device of the person obtained by a field device.

In some embodiments, to perform the responsive action comprises to produce an alert indicative of an unauthorized access to a field device.

In some embodiments, to analyze the user interaction data comprises to determine a manufacturer of each field device as a function of a device identifier in the user interaction data.

In some embodiments, to produce a report indicative of one or more field devices determined to be unreliable comprises to produce a report indicative of one or more field devices that are determined to be unreliable due to a manufacturer of the one or more field devices.

In some embodiments, to analyze the user interaction data comprises to determine a location of each field device in the industrial plant as a function of a field device identifier in the user interaction data and a data set that associates field device identifiers with portions of the industrial plant.

In some embodiments, to perform the responsive action comprises to produce an alert indicative of unauthorized access to a portion of the industrial plant.

In some embodiments, to perform a responsive action comprises to produce a report indicative of one or more field devices that are determined to be unreliable due to the location of the one or more field devices in the industrial plant.

In some embodiments, to obtain the user interaction data comprises to obtain the user interaction data through wired or wireless communication with the one or more field devices.

In some embodiments, to analyze the user interaction data comprises to identify maintenance events for the one or more field devices.

In some embodiments, to analyze the user interaction data comprises to identify one or more field devices having a set of maintenance events that satisfies a predefined threshold.

In some embodiments, to identify one or more field devices having a set of maintenance events that satisfies a predefined threshold comprises to identify one or more field devices that have a higher frequency or duration of maintenance events than other field devices.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
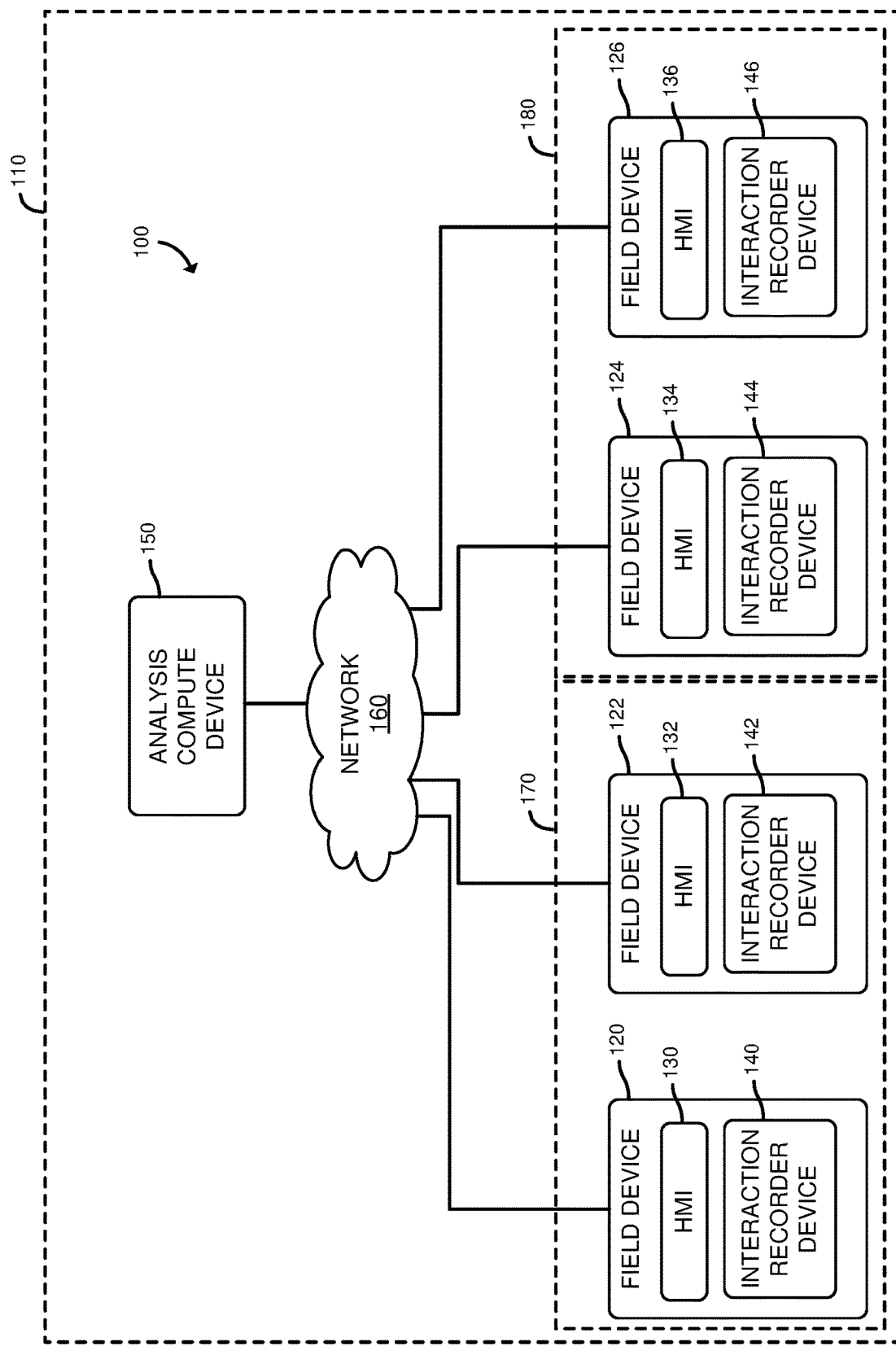
FIG. 1 is a simplified diagram of at least one embodiment of a system for field device interaction monitoring.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for field device interaction monitoring includes multiple field devices 120, 122, 124, 126 in communication with an analysis compute device 150. The system 100, in the illustrative embodiment, is associated with an industrial plant 110 (e.g., an oil refinement and/or distribution system, an electrical power generation or distribution system, etc.) that carries out one or more industrial processes (e.g., refinement and/or distribution of oil, generation and/or distribution of electrical power, etc.). Each field device may be embodied as any device that controls local operations (e.g., in the location of the field device) such as opening or closing valves or breakers, collecting data from one or more sensors, and/or other operations to carry out an industrial process of the industrial plant 110. In the illustrative embodiment, the field devices 120, 122, 124, 126 are located in different portions 170, 180 of the industrial plant 110 and may be subject to different environmental conditions (e.g., different ambient temperatures, different levels of vibration, etc.) and/or may undergo maintenance operations by different personnel (e.g., personnel assigned to perform maintenance in different portions of the industrial plant 110).

The field device 120, in the illustrative embodiment, includes a human machine interface (HMI) 130 which may be embodied as any component or set of components (e.g., button(s), keyboard(s), display(s), microphone(s), speaker(s), wireless communication device(s), such as Bluetooth device(s), etc.) capable of providing an interface for receiving information (e.g., commands, configuration data, etc.) from and providing information (e.g., status data, error messages, etc.) to a user of the field device 120. Additionally, the field device 120, in the illustrative embodiment, includes an interaction recorder device 140 which may be embodied as any device (e.g., a processor, a microcontroller, a field programmable gate array (FPGA), and/or application specific integrated circuit (ASIC), and a non-volatile memory) configured to store a (e.g., in the non-volatile memory) user interaction data indicative of a record of interactions (e.g., authentication credentials to access the functionality of the field device 120, commands, queries, etc.) made by a user through the human machine interface 130. The field devices 122, 124, 126, in the illustrative embodiment, include corresponding human machine interfaces 132, 134, 136 and interaction recorder devices 142, 144, 146 similar to the human machine interface 130 and interaction recorder device 140 of the field device 120. In operation, the analysis compute device 150 continually (e.g., at a predefined frequency, such as once an hour, once a day, once a week, etc.) receives the user interaction data stored by the field devices 120, 122, 124, 126 and analyzes the data to identify patterns, trends, and anomalies pertaining to the operation of the field devices 120, 122, 124, 126, the presence of users near the field devices 120, 122, 124, 126, and maintenance of the field devices 120, 122, 124, 126 and determines a responsive action, based on the analysis, to increase the efficiency with which the industrial process is executed at the industrial plant 110. More particularly, in the illustrative embodiment, the analysis compute device 150 determines one or more responsive actions to reduce the overhead that is being consumed by maintenance operations on one or more of the field devices 120, 122, 124, 126, such as due to inefficient maintenance staff that should receive additional training, relatively poor manufacture of the corresponding field device 120, 122, 124, 126, and/or other factors.

Figure 2:
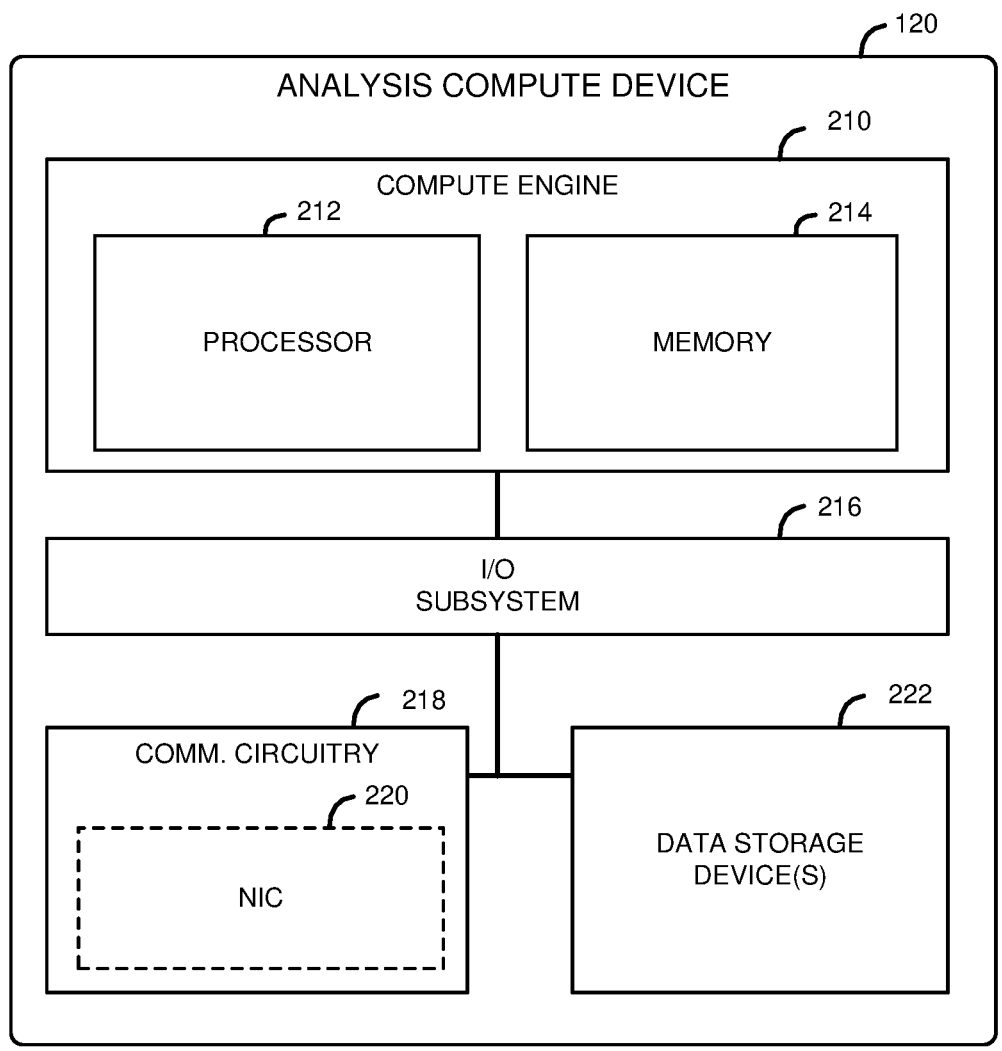
FIG. 2 is a simplified block diagram of at least one embodiment of an analysis compute device of the system of FIG. 1.

Referring now to FIG. 2, the illustrative analysis compute device 150 includes a compute engine 210, an input/output (I/O) subsystem 216, communication circuitry 218, and a data storage subsystem 222. Of course, in other embodiments, the analysis compute device 150 may include other or additional components, such as those commonly found in a computer (e.g., display, peripheral devices, etc.). Additionally, in some embodiments, one or more of the illustrative components may be incorporated in, or otherwise form a portion of, another component.

The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. Additionally, in some embodiments, the compute engine 210 includes or is embodied as a processor 212 and a memory 214. The processor 212 may be embodied as any type of processor capable of performing the functions described herein. For example, the processor 212 may be embodied as a single or multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. In some embodiments, all or a portion of the main memory 214 may be integrated into the processor 212. In operation, the main memory 214 may store various software and data used during operation such as user interaction data received from the field devices 120, 122, 124, 126, a data set that associates field device identifiers with manufacturers, a data set that associates field device identifiers with corresponding portions 170, 180 of the industrial plant 110, applications, programs, libraries, and drivers.

The compute engine 210 is communicatively coupled to other components of the analysis compute device 150 via the I/O subsystem 216, which may be embodied as circuitry and/or components to facilitate input/output operations with the compute engine 210 (e.g., with the processor 212 and the main memory 214) and other components of the analysis compute device 150. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the analysis compute device 150, into the compute engine 210.

The communication circuitry 218 may be embodied as any communication circuit, device, or collection thereof, capable of enabling communications over a communication link between the analysis compute device 150 and another device (e.g., a field device 120, 122, 124, 126, another compute device, etc.). The communication circuitry 218 may be configured to use any one or more communication technology (e.g., wired or wireless communications) and associated protocols (e.g., Ethernet, Bluetooth®, WiMAX, etc.) to effect such communication.

The illustrative communication circuitry 218 may include a network interface controller (NIC) 220. The NIC 220 may be embodied as one or more add-in-boards, daughter cards, network interface cards, controller chips, chipsets, or other devices that may be used by the analysis compute device 150 to connect with another device (e.g., the field devices 120, 122, 124, 126, another compute device, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the analysis compute device 150 at the board level, socket level, chip level, and/or other levels.

Each data storage device 222, may be embodied as any type of device configured for short-term or long-term storage of data such as, for example, memory devices and circuits, memory cards, hard disk drives, solid-state drives, or other data storage device. Each data storage device 222 may include a system partition that stores data and firmware code for the data storage device 222 and one or more operating system partitions that store data files and executables for operating systems.

The field devices 120, 122, 124, 126 may have components similar to those described with reference to the analysis compute device 150. The description of those components of the analysis compute device 150 is equally applicable to the description of components of the field devices 120, 122, 124, 126. Further, it should be appreciated that any of the analysis compute device 150 and the field devices 120, 122, 124, 126 may include other components, sub-components, and devices commonly found in a computing device, which are not discussed above in reference to the analysis compute device 150 and not discussed herein for clarity of the description. Further, it should be understood that one or more components of the analysis compute device 150 may be distributed across any distance, and are not necessarily housed in the same physical unit. Additionally, while a single analysis compute device 150 and four field devices 120, 122, 124, 126 are shown in FIG. 1, in other embodiments, the number of analysis compute devices and/or field devices may differ. For example, the functions of the analysis compute device 150 may be performed by multiple compute devices operating together (e.g., in a data center) and the number of field devices may be in the tens, hundreds, thousands, or more.

Referring back to FIG. 1, the field devices 120, 122, 124, 126 and the analysis compute device 150 are illustratively in communication via a network 160, which may be embodied as any type of data communication network, including local area networks (LANs) or wide area networks (WANs), digital subscriber line (DSL) networks, cable networks (e.g., coaxial networks, fiber networks, etc.), global networks (e.g., the Internet), cellular networks (e.g., Global System for Mobile Communications (GSM), 3G, Long Term Evolution (LTE), Worldwide Interoperability for Microwave Access (WiMAX), 4G, 5G, etc.), a radio access network (RAN), an edge network, or any combination thereof.

Figure 3:
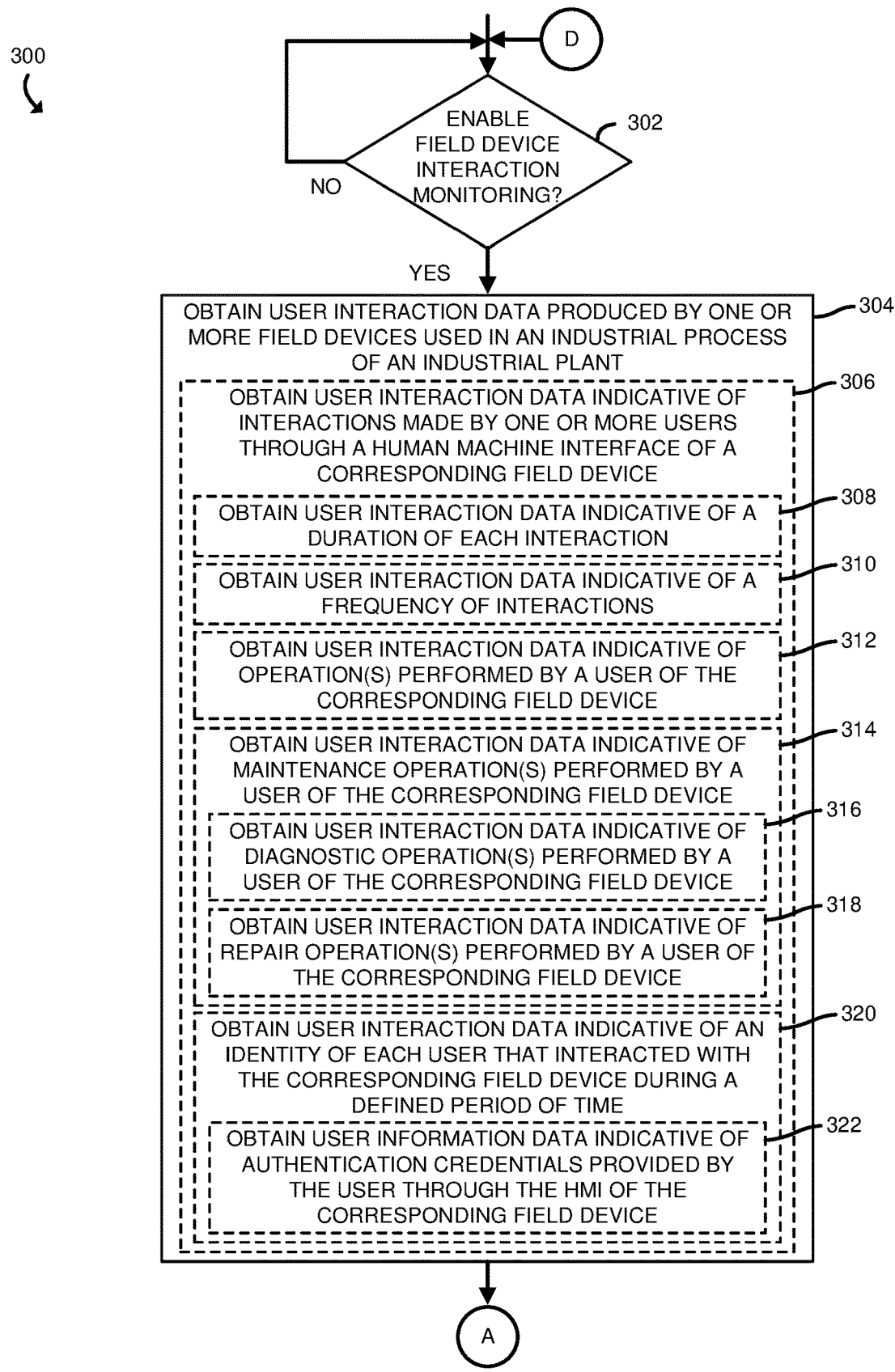
FIGS. 3-6 are simplified block diagrams of at least one embodiment of a method for field device interaction monitoring that may be performed by the system of FIG. 1.

Referring now to FIG. 3, the system 100, and in particular, the analysis compute device 150, may perform a method 300 for monitoring field device interactions (e.g., to determine one or more responsive actions to reduce maintenance-related overhead). In the illustrative embodiment, the method 300 begins with block 302, in which the analysis compute device 150 determines whether to enable field device interaction monitoring. In doing so, the analysis compute device 150 may determine to enable field device interaction monitoring in response to a determination that a configuration setting (e.g., in the memory 214) indicates to do so, in response to a request (e.g., from a user of the analysis compute device 150, received from another compute device (not shown), etc.) to enable field device interaction monitoring, in response to a determination that the analysis compute device 150 is communicatively connected to one or more of the field devices 120, 122, 124, 126, and/or based on other factors. Regardless, in response to a determination to enable field device interaction monitoring, the method 300 advances to block 304, in which the analysis compute device 150 obtains user interaction data produced by one or more field devices (e.g., the field devices 120, 122, 124, 126) used in an industrial process (e.g., oil refinement) of an industrial plant (e.g., the industrial plant 110). In doing so, and as indicated in block 306, the analysis compute device 150, in the illustrative embodiment, obtains user interaction data that is indicative of interactions made by one or more users through a human machine interface (e.g., the human machine interfaces 130, 132, 134, 136) of a corresponding field device (e.g., the field devices 120, 122, 124, 126).

As indicated in block 308, in obtaining user interaction data indicative of interactions made by one or more users, the analysis compute device 150 may obtain user interaction data that is indicative of a duration of each interaction (e.g., when the user logged into the corresponding field device 120, 122, 124, 126, when the first command or query was entered in an interaction, when the user logged out of the field device 120, 122, 124, 126, when the last command or query was entered in a given interaction, data indicative of the difference between the login time and the logout time, the difference between the first command or query time and the last command or query time, etc.). Additionally or alternatively, and as indicated in block 310, the analysis compute device 150 may obtain user interaction data that indicates a frequency of interactions (e.g., a number of interactions per hour, per day, per week, etc.) with the corresponding field device(s) (e.g., the field devices 120, 122, 124, 126). The analysis compute device 150, as indicated in block 312, may obtain user interaction data that is additionally indicative of the operation(s) (e.g., a code indicative of each operation, a description of each operation, etc.), performed by each user of the corresponding field device 120, 122, 124, 126.

As indicated in block 314, the analysis compute device 150 may obtain user interaction data indicative of one or more maintenance operations performed by a user of the corresponding field device 120, 122, 124, 126. For example, and as indicated in block 316, the analysis compute device 150 may obtain user interaction data indicative of one or more diagnostic operations performed by a user of the corresponding field device 120, 122, 124, 126. Additionally or alternatively, and as indicated in block 318, the analysis compute device 150 may obtain user interaction data indicative of one or more repair operations (e.g., placing the field device in a deactivated state to allow a maintenance operation(s) to be performed, replacing a component, reconfiguring the field device, reactivating the field device, etc.) performed by a user of the corresponding field device 120, 122, 124, 126. As indicated in block 320, the analysis compute device 150 may obtain user interaction data indicative of an identity of each user that interacted with the corresponding field device during a defined period of time (e.g., during a maintenance session). In doing so, and as indicated in block 322, the analysis compute device 150 may obtain user information indicative of authentication credentials (e.g., a personal identification number (PIN), a user name, a passcode, etc.) provided by the user through the human machine interface 130, 132, 134, 136 of the corresponding field device 120, 122, 124, 126.

Figure 4:
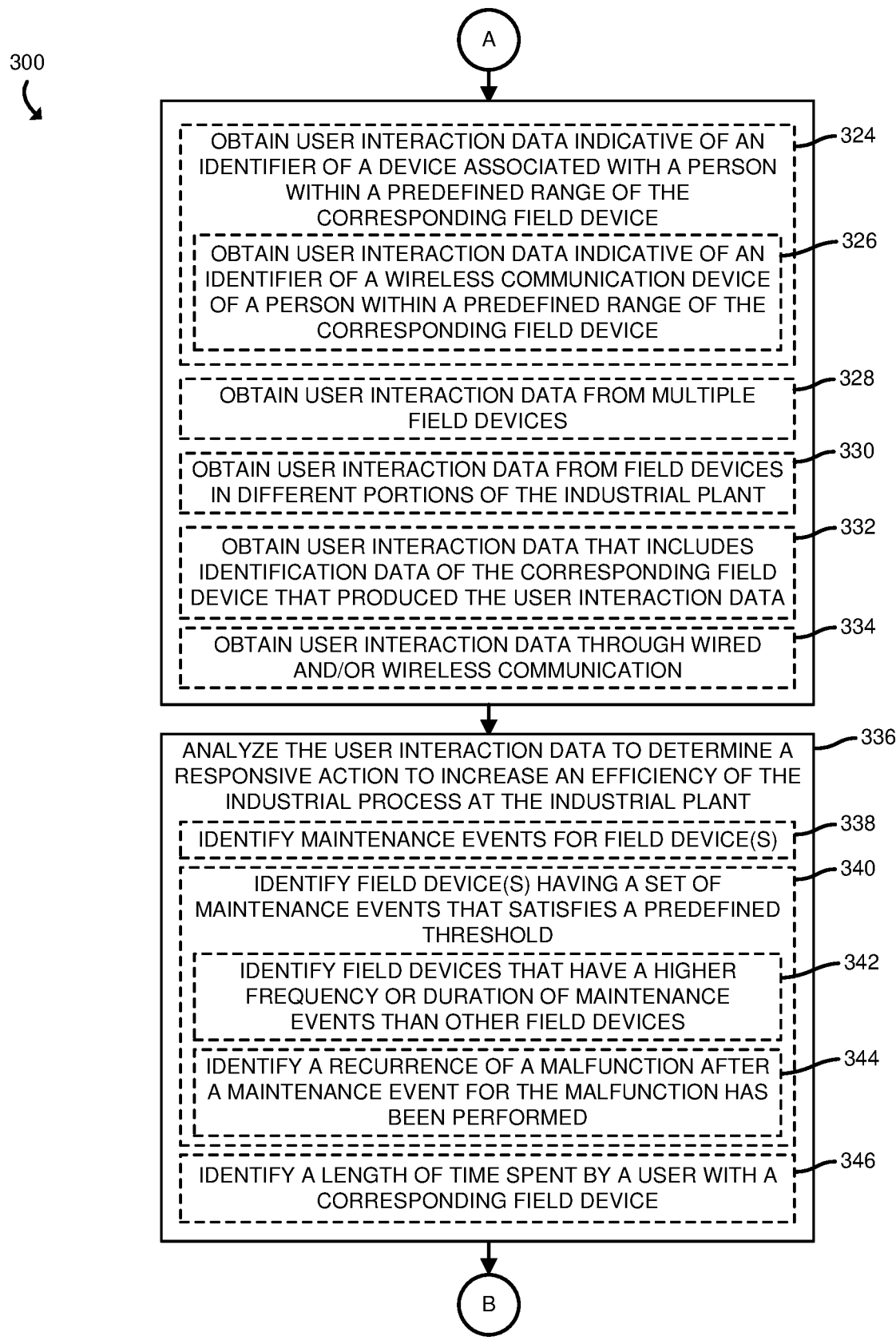

Referring now to FIG. 4, the analysis compute device 150, in obtaining user interaction data, may obtain user interaction data that is indicative of an identifier of a device associated with a person within a predefined range of a corresponding field device (e.g., the field device that produced the user interaction data), as indicated in block 324. For example, and as indicated in block 326, the analysis compute device 150 may obtain user interaction data indicative of an identifier (e.g., a media access control (MAC) address, serial number, or other unique identifier) of a wireless communication device (e.g., a mobile phone, a tablet, etc.) of a person within a predefined range (e.g., wireless communication range) of the corresponding field device (e.g., the field device that recorded the identifier of the wireless communication device). In the illustrative embodiment, the analysis compute device 150 obtains user interaction data from multiple field devices 120, 122, 124, 126 (e.g., tens, hundred, thousands, etc. of field devices), as indicated in block 328. Further, in the illustrative embodiment, the analysis compute device 150 obtains user interaction data from field devices 120, 122, 124, 126 that are located in different portions (e.g., portions 170, 180) of the industrial plant 110, as indicated in block 330. In the illustrative embodiment, the user interaction data includes an identifier (e.g., unique code) of the corresponding field device 120, 122, 124, 126 that produced (e.g., recorded) the user interaction data, as indicated in block 332. As described above, with reference to FIG. 1, the network 160 through which the analysis compute device 150 is communicatively connected to the field devices 120, 122, 124, 126 may include wired and/or wireless connections. As such, and as indicated in block 334, the analysis compute device 150 may obtain the user interaction data from the field devices 120, 122, 124, 126 through wired and/or wireless communication.

Still referring to FIG. 4, the method 300 advances to block 336 in which the analysis compute device 150 analyzes the user interaction data (e.g., the user interaction data obtained in block 304) to determine a responsive action to increase an efficiency of an industrial process (e.g., the process, such as the oil refinement, power generation, etc. that the field devices 120, 122, 124, 126 facilitate) at the industrial plant 110. In doing so, and as indicated in block 338, the analysis compute device 150 may identify maintenance events for field devices (e.g., the field devices 120, 122, 124, 126). As described above, the user interaction data may include data indicative of the operations performed with each field device 120, 122, 124, 126. As such, in at least some embodiments, the analysis compute device 150 may identify the maintenance events based on the data indicative of the operations performed on each field device (e.g., by comparing codes or descriptions of operations in the obtained user interaction data to a data set (e.g., in the data storage 222) of codes or descriptions classified as maintenance events). In block 340, having identified the maintenance events, the analysis compute device 150 may identify field devices 120, 122, 124, 126 having a set of maintenance events (e.g., maintenance events that were performed on those field devices 120, 122, 124, 126) that satisfies a predefined threshold. For example, and as indicated in block 342, the analysis compute device 150 may identify field devices (e.g., field devices 120, 122) that have a higher frequency or duration of maintenance events than other field devices (e.g., the field devices 124, 126). Additionally or alternatively, the analysis compute device 150 may identify a recurrence of a malfunction after a maintenance event for the malfunction has been performed (e.g., a maintenance event performed on the field device 120 to correct a malfunction, followed by a subsequent maintenance event performed on the same field device 120 within a predefined time period to correct the same malfunction), as indicated in block 344. Recurrence of a maintenance event for the same malfunction may be indicative of inefficient maintenance personnel that need additional training on performing maintenance tasks, deficiencies in the field device itself (e.g., the manufacturer produced the field device with insufficiently durable components) and/or environmental conditions (e.g., high vibration, ambient temperatures outside of a suitable range for the field device, etc.) associated with the field device. As indicated in block 346, the analysis compute device 150 may identify a length of time spent by a user (e.g., maintenance personnel) with a corresponding field device 120, 122, 124, 126.

Figure 5:
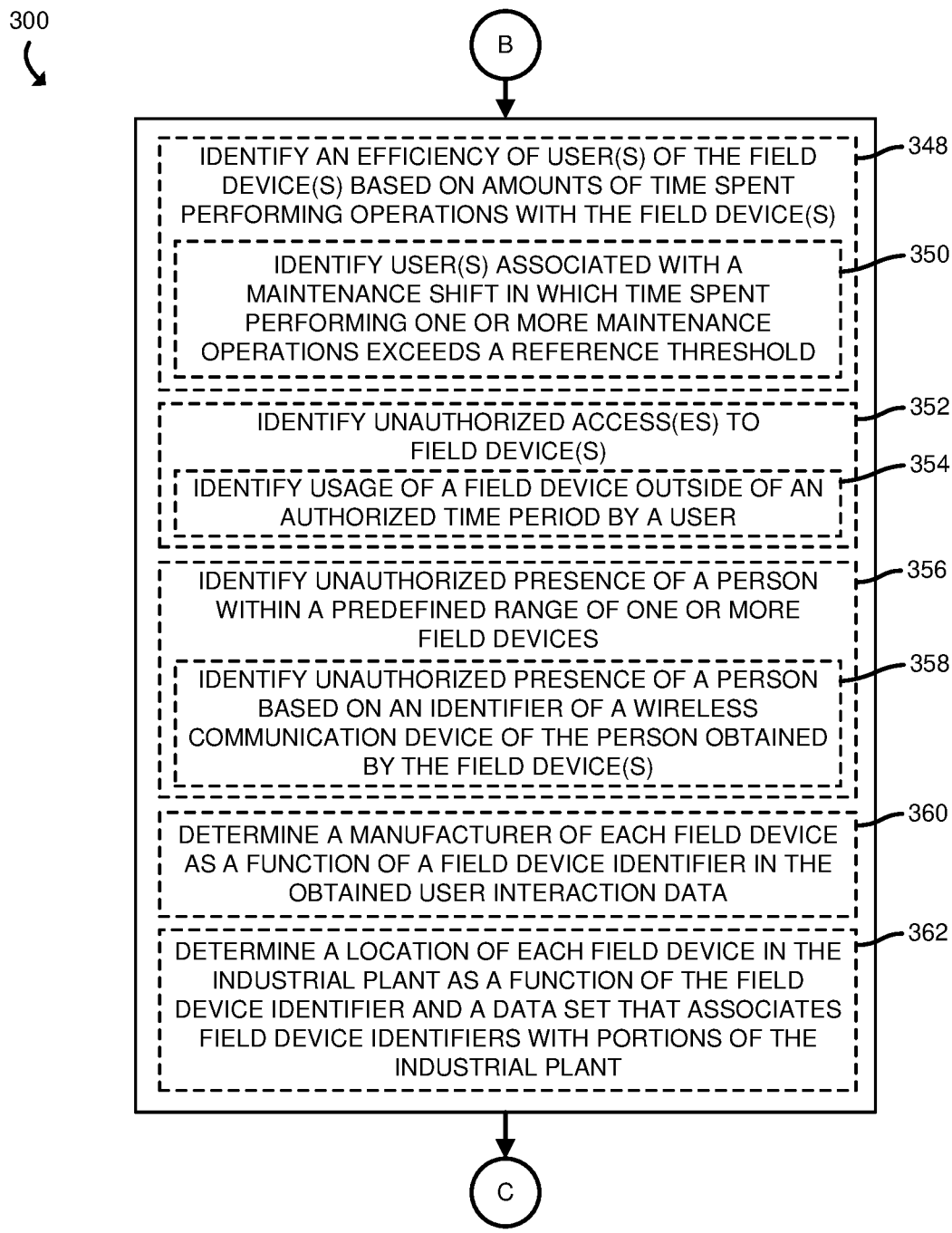

Referring now to FIG. 5, the analysis compute device 150 may identify an efficiency of users of the field devices 120, 122, 124, 126 based on amount of time spent performing operations with the field devices 120, 122, 124, 126, as indicated in block 348. In doing so, and as indicated in block 350, the analysis compute device 150 may identify one or more users associated with a maintenance shift (e.g., a time period, such as Tuesdays from 12 pm to 8 pm) in which time spent performing one or more maintenance operations exceeds a reference threshold (e.g., an amount of time stored in the data storage 222 and representing the average or expected amount of time for the maintenance operation(s) to be performed). Users associated with such a maintenance shift may be inefficient and may become more efficient with additional training. Additionally or alternatively, the analysis compute device 150 may identify improper access (e.g., security breaches, improper protocol, etc.) to one or more field devices 120, 122, 124, 126 when analyzing the obtained user interaction data, as indicated in block 352. In doing so, and as indicated in block 354, the analysis compute device 150 may identify usage of a field device 120, 122, 124, 126 outside of an authorized time period by a user (e.g., based on login information provided through the human machine interface 130, 132, 134, 136 indicating that a particular user was using the corresponding field device 120, 122, 124, 126 outside of their shift, outside of a time period for scheduled maintenance, etc.).

Still referring to FIG. 5, a field device 120, 122, 124, 126 that was not directly used by a person, but was within a predefined range of a user may record data (e.g., in the user interaction data) indicative of the presence of the person. As indicated in block 356, the analysis compute device 150 may identify an unauthorized presence of a person within a predefined range (e.g., ten meters or other predefined range, such as a range supported by a corresponding wireless communication device of the field device 120, 122, 124, 126), such as by comparing identifiers associated with users to a data set (e.g., in the data storage 222) indicative of time periods and locations within the industrial plant 110 where each user is permitted to be present. In doing so, and as indicated in block 358, the analysis compute device 150 may identify an unauthorized presence of a person based on an identifier of a wireless communication of the person (e.g., a MAC address of a person's mobile phone) obtained by a corresponding field device 120, 122, 124, 126 (e.g., within wireless communication range of the person's mobile phone). As indicated in block 360, the analysis compute device 150 may determine a manufacturer of each field device 120, 122, 124, 126 as a function of a field device identifier (e.g., serial number or other unique identifier) in the obtained user interaction data. For example, the analysis compute device 150 may compare a field device identifier (e.g., included in the user interaction data from the corresponding field device) to a data set that associates field device identifiers with manufacturers to determine the manufacturer for each field device 120, 122, 124, 126. Additionally or alternatively, and as indicated in block 362, the analysis compute device 150 may determine a location of each field device 120, 122, 124, 126 in the industrial plant as a function of the field device identifier and a data set (e.g., in the data storage 222) that associates field device identifiers with portions (e.g., the portions 170, 180) of the industrial plant 110.

Figure 6:
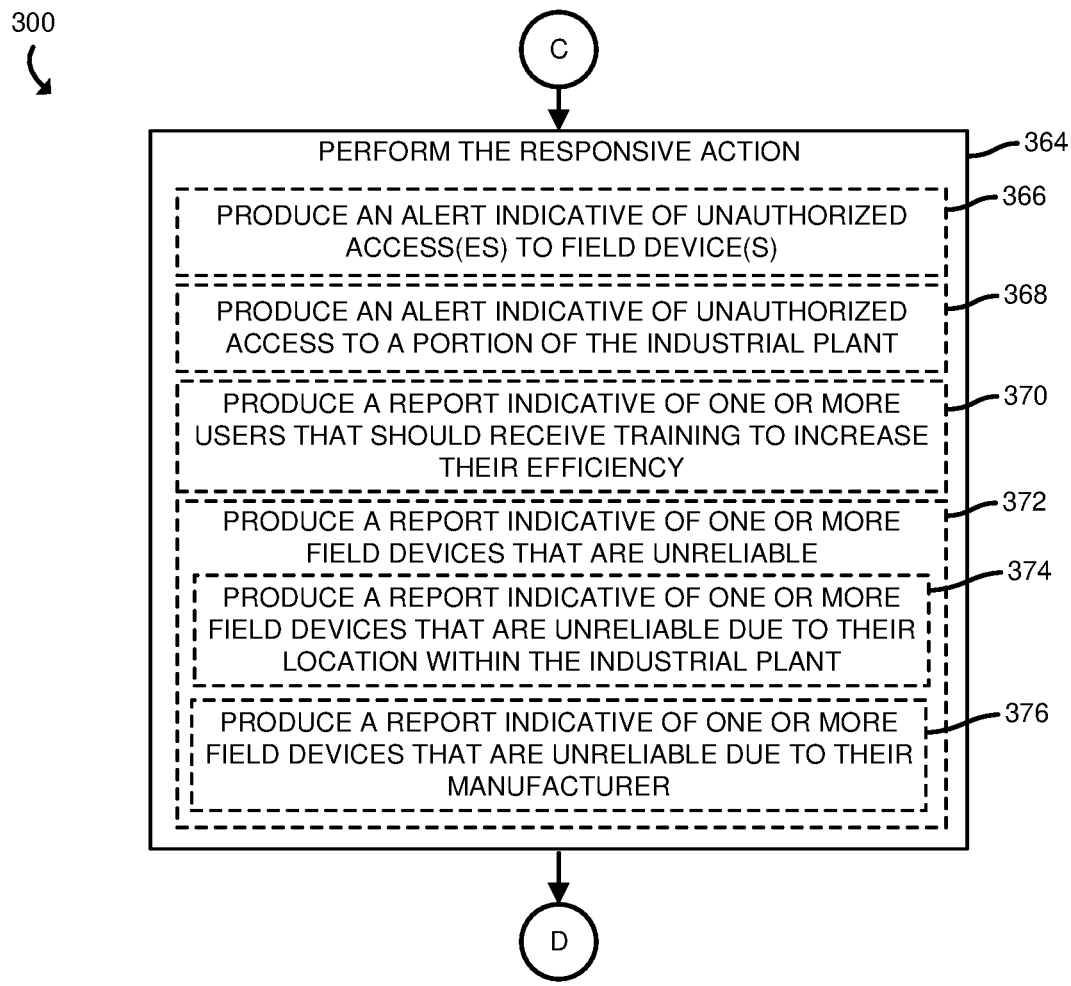

Referring now to FIG. 6, the analysis compute device 150, in the illustrative embodiment, performs a responsive action (e.g., the responsive action determined in block 336), as indicated in block 364. In doing so, and as indicated in block 366, the analysis compute device 150 may produce an alert (e.g., a visual alert displayed on one or more display devices, an audible alert, a message sent to another compute device, etc.) indicative of one or more unauthorized accesses to one or more field devices 120, 122, 124, 126 (e.g., based on the identification in block 352 of FIG. 5). Additionally or alternatively, and as indicated in block 368, the analysis compute device 150 may produce an alert indicative of one or more unauthorized accesses to a portion 170, 180 of the industrial plant 110 (e.g., based on the identification in block 356 of FIG. 5). In some embodiments, the analysis compute device 150 may produce a report (e.g., a message displayed on display device, a message sent to another compute device, etc.) indicative of one or more users that should receive training to increase their efficiency (e.g., one or more users determined to be inefficient in block 348), as indicated in block 370.

As indicated in block 372, the analysis compute device 150 may produce a report indicative of one or more field devices that are unreliable. In doing so, and as indicated in block 374, the analysis compute device 150 may produce a report indicative of one or more field devices (e.g., identified by field device identifier(s), the portion(s) of the industrial plant 110 where the field device(s) are located, etc.) that are unreliable due to their location(s) within the industrial plant 110. For example, the analysis compute device 150 may determine that field devices 120, 122 in the portion 170 experience more malfunctions than field devices 124, 126 in the portion 180 even though the field devices 120, 122, 124, 126 are of the same type, are from the same manufacturer, and are maintained by the same maintenance personnel, and produce a report indicating that the reason for the higher malfunction rate for the field devices 120, 122 is due to environmental conditions in the portion 180. In some embodiments, the analysis compute device 150 may produce a report indicative of one or more field devices that are unreliable due to their manufacturer (e.g., based on a determination, from blocks 340 and 360, that the field devices with recurring malfunctions have a different manufacturer than field devices without recurring malfunctions). Subsequently, the method 300 loops back to block 302 of FIG. 3, in which the analysis compute device 150 determines whether to continue to enable user interaction monitoring (e.g., obtaining additional user interaction data, analyzing the obtained user interaction data, and potentially performing additional responsive actions). While the operations of the method 300 are illustrated and described with reference to FIGS. 3-6 in a particular order, it should be understood that many of the operations could be performed in a different order or concurrently. For example, the system 100 may, in some embodiments, analyze obtained user interaction data while concurrently obtaining additional user interaction data.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. A system comprising:
an analysis compute device having circuitry configured to:
obtain user interaction data stored in one or more field devices used in an industrial process of an industrial plant, the one or more field devices installed at different portions of the industrial plant and configured to perform local operations in the industrial plant, each of the one or more field devices including a human machine interface, wherein the user interaction data is indicative of interactions with the one or more field devices made by one or more users through the human machine interface of a corresponding field device;
analyze the user interaction data to identify a plurality of maintenance events based on the interaction data;
analyze the plurality of maintenance events to identify a recurrence of a specific maintenance event occurring on the one or more field devices;
determine a responsive action to increase an efficiency of the industrial process at the industrial plant by reducing overhead being consumed by maintenance operations on the one or more of the field devices; and
perform the responsive action.

2. The system of claim 1, wherein to analyze the user interaction data comprises to identify an efficiency of one or more users of the one or more field devices based on a duration of the maintenance event for the one or more field devices.

3. The system of claim 2, wherein the circuitry is further to identify one or more users associated with a maintenance shift in which time spent performing one or more maintenance operations exceed a reference threshold.

4. The system of claim 3, wherein to perform the responsive action comprises to produce a report indicative of one or more users that should receive training to increase their efficiency.

5. The system of claim 1, wherein to obtain user interaction data comprises to obtain user interaction data that is further indicative of an identity of each user that interacted with the corresponding field device and wherein to analyze the user interaction data comprises to identify an unauthorized access to a field device.

6. The system of claim 5, wherein to identify an unauthorized access to a field device comprises to identify usage of a field device outside of an authorized time period.

7. The system of claim 1, wherein to analyze the user interaction data comprises to identify an unauthorized presence of a person within a predefined range of one or more field devices.

8. The system of claim 7, wherein to identify an unauthorized presence of a person comprises to identify an unauthorized presence of a person based on an identifier of a wireless communication device of the person obtained by a field device.

9. The system of claim 7, wherein to perform the responsive action comprises to produce an alert indicative of an unauthorized access to a field device.

10. The system of claim 1, wherein to analyze the user interaction data comprises to determine a manufacturer of each field device by comparing a device identifier to a data set that associates field device identifiers with manufacturers.

11. The system of claim 10, wherein to analyze the plurality of maintenance events includes to generate to produce a report indicative of one or more field devices determined to be unreliable by comparing the maintenance events of the one or more field devices and identifying common manufacturers between the maintenance events of the one or more field devices.

12. The system of claim 1, wherein to analyze the user interaction data comprises to determine a location of each field device in the industrial plant as a function of a field device identifier in the user interaction data and a data set that associates field device identifiers with portions of the industrial plant.

13. The system of claim 12, wherein to perform the responsive action comprises to produce an alert indicative of unauthorized access to a portion of the industrial plant.

14. The system of claim 12, wherein to perform a responsive action comprises to produce a report indicative of one or more field devices that are determined to be unreliable due to the location of the one or more field devices in the industrial plant.

15. The system of claim 1, wherein to obtain the user interaction data comprises to obtain the user interaction data through wired or wireless communication with the one or more field devices.

16. The system of claim 1, wherein to analyze the user interaction data comprises to identify one or more field devices having a set of maintenance events that satisfies a predefined threshold.

17. The system of claim 16, wherein to identify one or more field devices having a set of maintenance events that satisfies a predefined threshold comprises to identify one or more field devices that have a higher frequency or duration of maintenance events than other field devices.

18. A method comprising:
    obtaining, by an analysis compute device, user interaction data stored in one or more field devices used in an industrial process of an industrial plant, the one or more field devices installed at different portions of the industrial plant and configured to perform local operations in the industrial plant, each of the one or more field devices including a human machine interface, wherein the user interaction data is indicative of interactions with the one or more field devices made by one or more users through a human machine interface of the corresponding field device;
    analyzing, by the analysis compute device, the user interaction data;
    to identify a plurality of maintenance events based on the interaction data;
    analyzing the plurality of maintenance events to identify a recurrence of a specific maintenance even occurring on one or more field devices;
    determining a responsive action to increase an efficiency of the industrial process at the industrial plant by reducing overhead being consumed by maintenance operations on the one or more of the field devices; and
    performing, by the analysis compute device, the responsive action.

19. One or more non-transitory machine-readable storage media comprising a plurality of instructions stored thereon that, in response to being executed, cause a compute device to:
    obtain user interaction data stored in one or more field devices used in an industrial process of an industrial plant, the one or more field devices installed at different portions of the industrial plant and configured to perform local operations in the industrial plant, each of the one or more field devices including a human machine interface, wherein the user interaction data is indicative of interactions with the one or more field devices made by one or more users through the human machine interface of a corresponding field device;
    analyze the user interaction data to identify a plurality of maintenance events based on the interaction data;
    analyze the plurality of maintenance events to identify a recurrence of a specific maintenance event occurring on one or more field devices;
    determine a responsive action to increase an efficiency of the industrial process at the industrial plant by reducing overhead being consumed by maintenance operations on the one or more of the field devices; and
    perform the responsive action.

* * * * *